United States Patent Office 3,642,981
Patented Feb. 15, 1972

3,642,981
TOXIC CHEMICAL VACCINES
John J. Cuculis, Baltimore, Howard G. Meyer, Abingdon, Van M. Sim, Bel Air, and Ludwig A. Sternberger, Lutherville, Md., assignors to the United States of America as represented by the Secretary of the Army
No Drawing. Filed May 4, 1970, Ser. No. 34,547
Int. Cl. A01k 27/00
U.S. Cl. 424—88
10 Claims

ABSTRACT OF THE DISCLOSURE

A composition of matter and method useful as a vaccine prophylactic means to protect mammals against poisoning by anticholinesterase compositions; the vaccine being the product resulting from the reaction of a carrier with a compound selected from the group

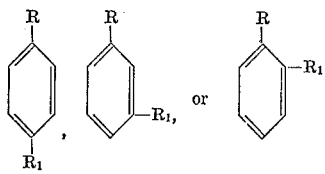

wherein R is any organophosphate or organophosphonate and $R_1$ is a member selected from the group of diazonium, carboxyl, amino acid, amide, isocyanate, or isothiocyanate.

The carrier can be any protein such as hemocyanin, ferritin, gamma G immunoglobulin, and egg albumin having a molecular weight in excess of 500,000 or any non-protein substance foreign to the host and having a molecular weight in excess of 500,000. The vaccination is carried out by conventional means such as intramuscular, subcutaneous, aerosol, or intravenous injections.

DEDICATORY CLAUSE

The invention described herein may be manufactured, used, and licensed by or for the Government for governmental purposes without the payment to us of any royalty thereon.

Our invention relates to a new composition of matter and method useful as a vaccine prophylactic means to protect mammals against poisoning by an anticholinesterase composition such as isopropyl methylphosphonofluoridate, diisopropyl phosphonofluoridate, diethyl-p-nitrophenyl phosphate, ethyl phosphorodimethylamidocyanidate, and tetraethyl pyrophosphate.

While means are known to overcome the toxic effects due to poisoning by inhibitors of the enzyme cholinesterase, such as disclosed in U.S. Pats. Nos. 2,816,113; 3,045,025; and 3,063,901, the prior art was directed to antidotes for treatment after the aforementioned poisoning had occurred; and there was no prior existing vaccine or antigen which could be injected into a body system to change the state of immunity of the recipient to alter the body resistance against poisoning by the aforementioned antichlolinesteratic compositions. Our invention was conceived and reduced to practice to solve the above discussed problem and to satisfy the long felt need for a vaccine and antigen injection which permanenly changes the immunological state of a recipient to provide a prophylaxis against poisoning by the aforementioned anticholinesteratic compositions.

The principal object of our invention is to provide a reliable and effective composition and method to change the immunological state of a mammal body system to provide prophylaxis against poisoning of the body system by an anticholinesteratic composition.

Another object of our invention is to provide a vaccine and antigen to inject into a mammal body system to elicit formation of antibodies within the body system which react rapidly and covalently with hapten or antigen.

Other objects of our invention will be obvious or will appear from the specification hereinafter set forth.

The aforementioned named anticholinesteratic compositions are among the most poisonous substances known; a few milligrams of the materials being capable of killing a mammal within a few minutes after entry of the poison within the mammal body system. Symptoms of choking start within seconds after entry of the poison into the body system, entry being gained either through contact of the poison with the body skin or through inhalation, and death results from respiratory paralysis. When an anticholinesteratic composition, such as a phosphonate, is introduced into a body system, the poison binds in the catalytic site of the enezyme and enzyme action hydrolyzes the poison to a leaving group, such as nitrophenol, and esterifies the serine in the enzyme catalytic site with the phosphonate to rapidly produce an irreversibly inactivated enzyme. While the prior art antidotes for anticholinesteratic poisoning, such as atropine and the various oximes, were found to be effective against limited doses of the aforementioned anticholinesteratic compositions, the antidotes presented the disadvantages that they must be administered to a recipient within a very short time prior to poisoning, which required a prior knowledge about impending poisoning, to be effective. Continuous administration of the antidotes is not satisfactory due to the concomitant side effects produced.

Our invention is operable, because the aforementioned anticholinesteratic compositions are small molecular substances and antibodies specific to a small molecular substance can be produced by suitably conjugating the small molecular substance to a large molecular substance and the conjugated complex used as an antigen; the antibodies being produced being capable of specifically binding a small molecular substance. When a mammal body system containing antibodies against anticholinesteratic substances has an anticholinesteratic substance introduced into the body system, binding of the anticholinesteratic substance with the antibodies competes with the reaction of the anticholinesteratic substance with acetylcholinesterase to diminish the poisonous effects of the anticholinesteratic substance on the body system. Since the reaction of small molecular substances with their specific antibodies is highly reversible, a large excess of antibodies is needed to afford protection against anticholinesteratic poisoning. Our vaccine is the product resulting from the reaction of a carrier with a compound selected from the group

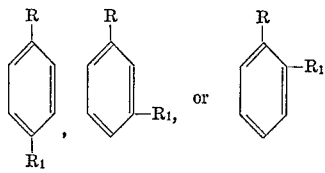

wherein R is any organophosphate organophosphonate and $R_1$ is a member selected from the group of diazonium, carboxyl, amino acid, amide, isocyanate, and isothiocyanate; the carrier being any protein such as hemocyanin, ferritin, gamma G immunoglobulin, and egg albumin having a molecular weight in excess of 500,000 or any non-protein substance foreign to the host and having a molecular weight in excess of 500,000.

We unexpectedly discovered that antibodies can be produced that react irreversibly with the aforementioned anticholinesteratic compositions. Due to the irreversibility, the antibodies are highly effective in competing with the anticholinesteratic composition for the acetylcholinesterase. To produce antibodies which react irreversibly with an anticholinesteratic composition, the immunization conjugation must be stereospecifically similar to the phosphonate or phosphate moiety of the anticholinesteratic composition as well as stereo-specifically homologous to the leaving group, such as a nitrophenol group, of the anticholinesteratic composition. Since immunity is produced by aggregated protein and non-aggregated protein causes immune tolerance, only protein molecules having molecular weights in excess of 500,000 are used in our vaccines; our proteins being carefully ultracentrifuge separated from smaller protein molecular weights.

EXAMPLE

Three moles of HCl and one mole of p-aminophenyl-diethylphosphate were diazotized at 5 to 10° C. with sodium nitrite, sodium nitrite being 0.1 to 0.5 molar, to the starch iodide endpoint in the conventional manner. Excess diazotized material was added to a hemocyanin carrier in the molecular ratio of 4000:1 respectively and the mixture was allowed to stand and react at room temperature for approximately one hour buffered to a pH of 7.2. Upon completion of the reaction, the deep reddish brown liquid conjugated hemocyanin-diazotized material reaction product is purified by gel filtration at 2° to 4° C. in the conventional manner to remove impurities; the filter medium being an dextran having a fractionation range of 100 to 5000 molecular weight, an exclusion limit of 5000 molecular weight, and 2.5±0.2 grams of water per gram of dry gel water regain. Immunization with the purified product is carried out by three injections, three weeks apart, of 10 mg. of protein per injection in the product per kg. of mammal weight, the protein content being determined by conventional nephelometer colorimetric technique. The purified product has a molecular weight ratio of diazotized material to carrier in the ratio of 800 to 1 respectively as determined by routine protein and phosphorus analysis.

Although the reaction product in the example is deep reddish brown, the color will vary depending on the particular carrier utilized. While the example shows the para form of aminophenyldiethylphosphate, the ortho and meta forms are also applicable in using our invention. Also, an amino, carboxyl, amino acid, isocyanate, or isothiocyanate group can be substituted for the diazonium group. Further, any other organophosphate or organophosphonate group, such as o-pinacolylmethylphosphonate, can be substituted for the diethylphosphate moiety. Again, any large protein molecule, such as ferritin, or an artificial polymer of smaller proteins, such as gamma G immunoglobulin or egg albumin can be substituted for the hemocyanin as the protein carrier. Moreover, we can use any non-protein substance foreign to the host and having a molecular weight in excess of 500,000 as our carrier. While the example shows the injection dosage to be 10 mg. per kg., the injection dosage can range from 0.2 mg./kg. to 50 mg./kg.; the schedule of immunization can vary widely within the skill of the art and can be carried out by the conventional intramuscular, subcutaneous, aerosol, and intravenous routes. If it is desired to absorb antigen over a longer period of time, the antigen can be adsorbed on alumina, the particle size of the alumina being predetermined as dependent on the gauge of injection needle to be used, or along with adjuvants, such as mineral oil.

The efficacy of our vaccine composition and method is demonstrated by the results of the immunization and subsequent anticholinesteratic material challenge on three rabbits in the two groups as set forth in the table appended below. The immunizaion was intravenously and the challenge subcutaneously administered.

GROUP I

| Injection | Day | Mg. of protein/kg. animal weight | Mg. of protein/ml. of vaccine |
|---|---|---|---|
| 1 | 0 | 10 | 36 |
| 2 | 35 | 10 | 36 |
| 3 | 59 | 10 | 36 |
| 4 | 97 | 10 | 36 |

On day 66, each animal vaccinated as above in Group I was administered 2 $LD_{50}$ dosages (0.75 mg. of anticholinesteratic material/kg. of animal weight) of anticholinesteratic composition with no symptoms except slight fasciculation at the site of the anticholinesteratic injection. On day 97, each animal vaccinated as above in Group I was administered 3 $LD_{50}$ dosages (1.125 mg. of anticholinesteratic material/kg. of animal weight) of anticholinesteratic composition with no symptoms except slight fasciculation at the site of the anticholinesteratic injection.

GROUP II

| Injection | Day | Mg. of protein/kg. animal weight | Mg. of protein/ml. of vaccine |
|---|---|---|---|
| 1 | 0 | 10 | 58 |
| 2 | 21 | 10 | 58 |
| 3 | 34 | 10 | 58 |
| 4 | 108 | 10 | 58 |
| 5 | 127 | 10 | 58 |

On day 131, each animal vaccinated as above in Group II was administered 4 $LD_{50}$ dosages (1.475 mg. of anticholinesteratic material/kg. of animal weight) of anticholinesteratic composition with no symptoms except slight fasciculation at the site of the anticholinesteratic injection.

It is obvious that other modifiactions can be made of our invention, and we desire to be limited only by the scope of the appended claims.

We claim:

1. A vaccine to protect mammals against poisoning by an anticholinesterase composition; the vaccine being the conjugate reaction product produced by the reaction of a carrier selected from the group consisting of aggregated protein having a molecular weight in excess of 500,000 and a non-protein substance foreign to the host and having a molecular weight in excess of 500,000 with a compound selected from the group consisting of

[chemical structures: three benzene rings with R and $R_1$ substituents]

wherein R is a member selected from the group consisting of organophosphate and organophosphonate and $R_1$ is a member selected from the group consisting of diazonium, amide, isocyanate, isothiocyanate, carboxyl, and amino acid and being administered in a dose range of 0.2 mg./kg. to 50 mg./kg.

2. The vaccine of claim 1 wherein the protein is a material selected from the group consisting of hemocyanin, ferritin, gamma G immunoglobulin, and egg albumin.

3. The vaccine of claim 1 wherein the conjugate is a liquid having a molecular ratio of 800 to 1 of a diazotized material to a carrier respectively.

4. The vaccine of claim 1 wherein R is a member selected from the group consisting of diethylphosphate and pinacolylmethylphosphonate.

5. A method of immunizing a mammal body system against poisoning by an anticholinesterase composition with the vaccine of claim 1 comprising the steps of injecting three injection dosages three weeks apart of 0.2 mg. to 50 mg. of a purified reaction product per kilogram of mammal weight to be absorbed by the mammal body system to immunize the mammal, the mg. weight of the product being based on the protein content of the product as measured by nephelometer colorimetry and the reaction product being produced by diazotizing three moles of HCl and one mole of a compound selected from the group consisting of

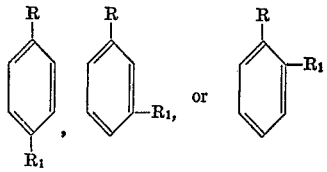

with sodium nitrite at 5° to 10° C. to the starch iodide endpoint, wherein R is a member selected from the group consisting of organophosphate and organophosphonate and $R_1$ is a member selected from the group consisting of diazonium, amide, isocyanate, carboxyl, amino acid, and isothiocyanate, adding excess of the diazotized material to a carrier selected from the group consisting of aggregated protein having a molecular weight in excess of 500,000 and a non-protein substance foreign to the host and in excess of a molecular weight of 500,000, as starting materials in the molecular ratio of 4000:1 respectively, reating the diazotized material with the carrier by allowing the starting materials to stand at room temperature for approximately one hour buffered to a pH of 7.2 to produce a liquid conjugated reaction product, and purifying the reaction product by gel filtration at 2° to 4° C.; and immunizing the mammal body system.

6. The method of claim 5 wherein the weight of injection dosage is 20 mg./kg.

7. The method of claim 5 wherein the protein is a material selected from the group consisting of hemocyanin, ferritin, gamma G immunoglobulin, and egg albumin.

8. The method of claim 5 wherein the purified product absorbed by the mammal body system is designed to be absorbed over a longer period of time by adsorbing the product on alumina.

9. The method of claim 5 wherein the purified product absorbed by the mammal body system is designed to be absorbed over a longer period of time by injecting the product along with adjuvants.

10. The method of claim 9 wherein the adjuvant is mineral oil.

No references cited.

RICHARD L. HUFF, Primary Examiner

U.S. Cl. X.R.
424—359